United States Patent
Harunari et al.

(10) Patent No.: US 6,966,303 B2
(45) Date of Patent: Nov. 22, 2005

(54) EGR CONTROL APPARATUS FOR DIESEL ENGINE

(75) Inventors: Toshiaki Harunari, Yashio (JP); Koichiro Yomogida, Fujisawa (JP); Nobutaka Ishii, Fujisawa (JP); Kazuya Tomikawa, Fujisawa (JP); Futoshi Nakano, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/899,900

(22) Filed: Jul. 27, 2004

(65) Prior Publication Data

US 2005/0022792 A1  Feb. 3, 2005

(30) Foreign Application Priority Data

Jul. 30, 2003 (JP) .............................. 2003-203702

(51) Int. Cl.[7] .................. F02D 41/04; F02M 25/07; F02M 51/00
(52) U.S. Cl. .................. 123/478; 123/568.21
(58) Field of Search .................. 123/295, 305, 123/478, 480, 486, 488, 492, 493, 568.16, 123/368.21, 568.23, 568.24; 60/605.2; 701/104, 701/105, 108

(56) References Cited

U.S. PATENT DOCUMENTS

| | | | |
|---|---|---|---|
| 4,976,239 A | 12/1990 | Hosaka | 123/399 |
| 5,002,031 A * | 3/1991 | Kako | 123/486 |
| 5,979,396 A * | 11/1999 | Yasuoka | 123/295 |
| 6,142,117 A * | 11/2000 | Hori et al. | 123/568.21 |
| 6,167,873 B1 * | 1/2001 | Kataoka | 123/568.24 |

FOREIGN PATENT DOCUMENTS

| | | | |
|---|---|---|---|
| EP | 1 234 970 A2 | 2/2002 | |
| JP | 55128649 | 10/1980 | |
| JP | 63094036 | 4/1988 | |
| JP | 08296470 A * | 11/1996 | ............ 123/568.21 |
| JP | 08303278 | 11/1996 | |
| JP | 08-338318 | 12/1996 | |
| JP | 09-324673 | 12/1997 | |
| JP | 2000-205055 | 7/2000 | |
| JP | 2001342877 | 12/2001 | |
| JP | 57086535 | 5/2002 | |
| JP | 2002256915 | 9/2002 | |

OTHER PUBLICATIONS

Copy of European Search Report for Serial No. EP 04 01 8149 dated Nov. 9, 2004.

* cited by examiner

Primary Examiner—Willis R. Wolfe, Jr.
(74) Attorney, Agent, or Firm—McCormick, Paulding & Huber LLP (57) ABSTRACT

An EGR control apparatus for a diesel engine which can stop EGR in advance of increase of a fuel injection quantity when acceleration of the engine comprises: EGR means (4) to adjust an EGR volume which is recirculated from an exhaust pipe (2) to an intake pipe (3); filter means (23) to carry out a smoothening-process to an accelerator opening degree detected by an accelerator opening degree sensor; injection quantity determination means (24) to determine a target fuel injection quantity to be injected from an injector (20), using the accelerator opening degree after smoothening-processed; and control means (25) to calculate a fuel injection quantity for judging EGR stop (Qcut), using the accelerator opening degree before smoothening-processed, to allow the EGR means (4) to carry out a decrease control for the EGR volume when the fuel injection quantity for judging EGR stop (Qcut) exceeds a predetermined threshold value (Hi).

16 Claims, 6 Drawing Sheets

EGR CONTROL APPARATUS FOR DIESEL ENGINE

CROSS REFERENCE TO RELATED APPLICATION

Applicants hereby claim foreign priority benefits under U.S.C. §119 of Japanese Patent Application No. 2003-203702, filed on Jul. 30, 2003, and the content of which is herein incorporated by reference.

BACKGROUND OF THE INVENTION

1. Field of the Invention

This invention relates to an EGR (Exhaust Gas Recirculation) control apparatus, and in particular, an EGR control apparatus for a diesel engine which can conduct a decrease control for an EGR volume in at least a high load region of the engine operating state when the engine accelerates, in order to avoid a smoke aggravation and a poor acceleration.

2. Description of the Related Art

EGR is a technology in which a part of exhaust gas is recirculated from an engine exhaust pipe to an engine combustion chamber to lower combustion temperature for reducing NOx (oxides of nitrogen) to be generated (see Japanese Patent Application published with No. 09-324673, for example).

If the EGR is performed when the diesel engine is accelerated and the engine operating state shifts into a high load region because the accelerator is depressed, since a fuel injection quantity increases under conditions that an intake air volume is relatively decreased by EGR gas rate, the intake air volume tends to be insufficient relative to the fuel injection quantity. This may cause the smoke aggravation and/or the poor acceleration. In such a case, EGR is stopped to secure a volume of fresh intake air supplied to a cylinder. The stop of EGR is performed when a target fuel injection quantity exceeds a predetermined threshold value in at least the high load region of the engine operating state (i.e., EGR stop region). The target fuel injection quantity is calculated based on an accelerator opening degree and an engine rotating speed, etc.

While the target fuel injection quantity equals to an actual fuel injection quantity to be injected from an injector, it is also used as a parameter for judging the stop of EGR. For the reason above, when the accelerator is depressed, a detected value by the accelerator opening sensor is processed by a smoothening-process in order to ease an impact at the time of acceleration, and then the target fuel injection quantity is determined based on the accelerator opening degree after smoothening-processed. When the target fuel injection quantity after smoothening-processed as such exceeds a predetermined threshold value in at least the high load region of the engine operating state (i.e., EGR stop region), EGR is stopped, and simultaneously, a corresponding quantity of fuel to the target fuel injection quantity is injected from the injector.

Here, in a fuel injection system in recent years, as is obvious by the fact that the injector can adapt to a pilot injection or a multi injection, the quantity of the fuel injected from the injector can be rapidly increased in response to an increase of the target fuel injection quantity after smoothening-processed as described above. However, with regard to the stop of EGR, since it is carried out by dosing an EGR valve provided in an EGR passage which connects the engine exhaust pipe with the engine intake pipe, a certain amount of time lag is unavoidable which is caused by a mechanical time lag and an airflow lag.

It is now assumed that actuators for the injector and the EGR valve are respectively Inputted with the increase signals of the target injection quantity after smoothening-processed, and the increase control for the fuel injection quantity and the dosing control for the EGR valve are conducted based on these signals. The injector is quick to respond to the increase of the target fuel injection quantity after smoothening-processed, and can promptly inject the actual, increased quantity of fuel corresponding to the target fuel injection quantity. However, this increase of the fuel injection quantity precedes the stop of EGR, because a mechanical actuation lag, the airflow lag, and the lag caused by the smoothening-process simultaneously occur in the EGR valve actuator side. As a result, in practice, EGR is not stopped for a certain period of time since the actual fuel injection quantity is increased. For this reason, during the certain period of time (EGR stop lag time), the intake air volume tends to be insufficient relative to the fuel injection quantity, and the smoke aggravation and/or the poor acceleration may occur.

SUMMARY OF THE INVENTION

It is an objective of this invention to provide an EGR control apparatus for a diesel engine that can carry out a decrease control of the EGR in advance of (or approximately at the same time as) increase of the fuel injection quantity at the time of acceleration to prevent the smoke aggravation and the poor acceleration caused by deficiency of the intake air volume.

In order to achieve the above-mentioned objective, an EGR control apparatus for a diesel engine concerning a first invention comprises: EGR means to adjust EGR volume which is recirculated from an exhaust pipe to an intake pipe; filter means to carry out a smoothening-process to an accelerator opening degree detected by an accelerator opening degree sensor; injection quantity determination means to determine a target fuel injection quantity to be injected from an injector, using the accelerator opening degree after smoothening-processed; and control means to calculate a fuel injection quantity for judging EGR stop, using the accelerator opening degree before smoothening-processed, to allow the EGR means to carry out a decrease control for the EGR volume when the fuel injection quantity for judging EGR stop exceeds a predetermined threshold value.

An EGR control apparatus for a diesel engine concerning a second invention comprises: EGR means to adjust EGR volume which is recirculated from an exhaust pipe to an intake pipe; calculation means to calculate a provisional fuel injection quantity, using an accelerator opening degree detected by an accelerator opening degree sensor; filter means to carry out a smoothening-process to the provisional fuel injection quantity calculated by the calculation means; fuel injection quantity determination means to control a fuel injection quantity to be injected from an injector, using the fuel injection quantity after smoothening-processed; and control means to allow the EGR means to carry out a decrease control for the EGR volume when the provisional fuel injection quantity before smoothening-processed exceeds a predetermined threshold value.

The EGR means may have an EGR passage which connects the exhaust pipe and the intake pipe with each other, and an EGR valve which is provided in the EGR passage and adjusts the EGR volume by changing its passage area.

The EGR means may have an EGR passage which communicates the exhaust pipe and the intake pipe with each other, and an intake throttle valve which is provided in the intake pipe at upstream side of a position connected with the EGR passage and adjusts the EGR volume by changing a passage area of the intake pipe.

DESCRIPTION OF THE PREFERRED EMBODIMENTS

Preferred embodiments of this invention will now be described with reference to the accompanying drawings.

Figure 5:
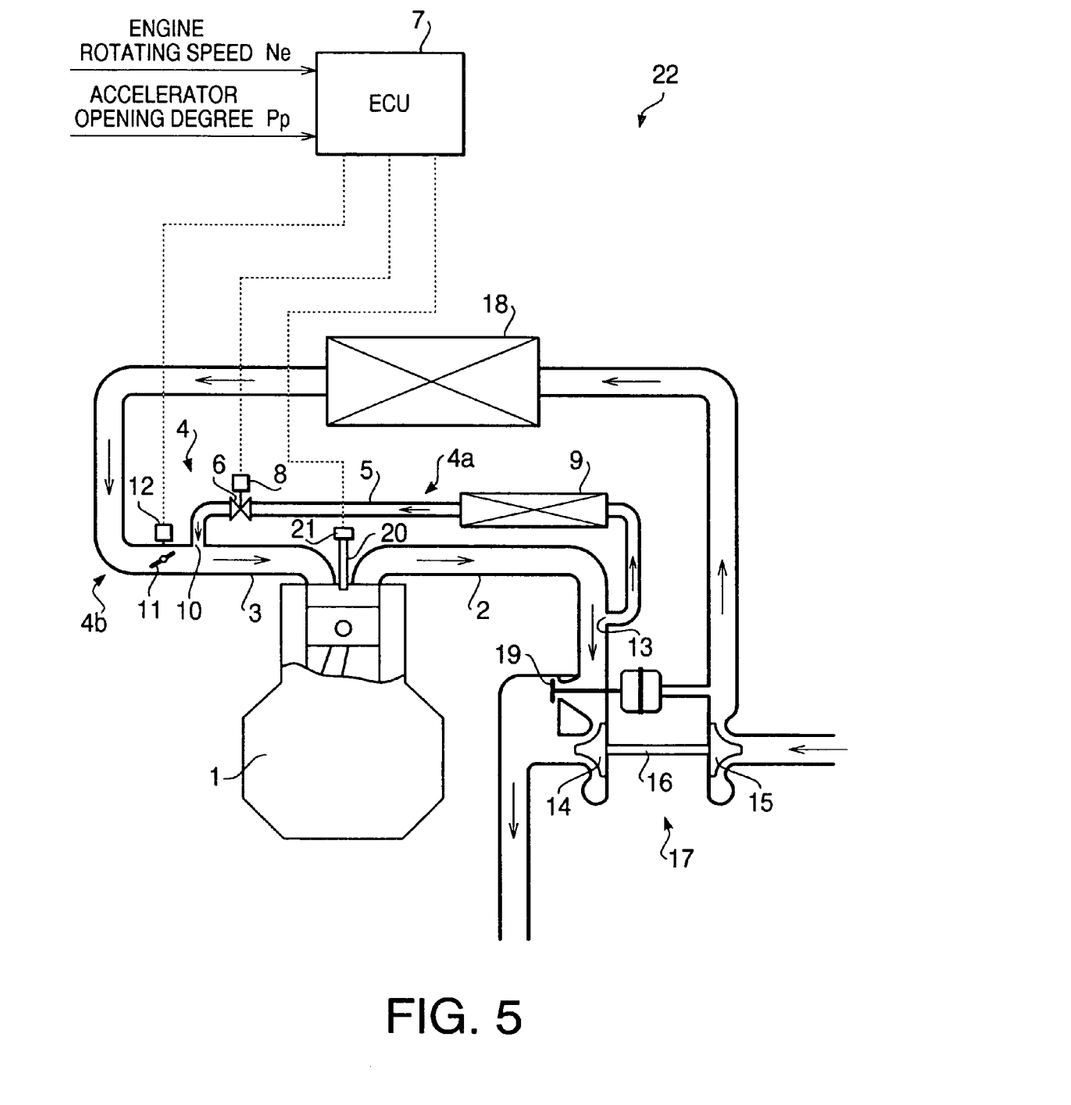
FIG. 5 is a diagram depicting a diesel engine provided with the above-mentioned EGR control apparatus.

FIG. 5 depicts a diesel engine 1 provided with an EGR control apparatus 22 concerning this embodiment. The diesel engine 1 is provided with EGR means 4 to adjust a volume of EGR gas recirculated from an exhaust pipe 2 to an intake pipe 3. The EGR means 4 constitutes a part of the EGR control apparatus 22, and consists of first EGR means 4a and second EGR means 4b.

The 1st EGR means 4a has an EGR passage 5 which connects an exhaust pipe 2 and an intake pipe 3 with each other, and an EGR valve 6 which is provided in the EGR passage 5 and changes a passage area of the EGR passage 5. An opening degree of the EGR valve 6 is adjusted by an actuator 8 connected to an ECU (Electronic Control Unit) 7, EGR volume will increase If the EGR valve 6 is controlled to open, while the EGR volume will decrease if the EGR valve 6 is controlled to dose. An EGR cooler 9 is provided in the EGR passage 5.

The 2nd EGR means 4b has the above-mentioned EGR passage 5, and an intake throttle valve 11 which is provided in the intake pipe 3 at upstream side of a position 10 connected with the EGR passage 5 and changes a passage area of the intake pipe 3. An opening degree of the intake throttle valve 11 is adjusted by an actuator 12 connected to the ECU 7. EGR volume will decrease if the intake throttle valve 11 is controlled to open, while the EGR volume will increase if the intake throttle valve 11 is controlled to close.

A turbine 14 is provided in the exhaust pipe 2 at a downstream side of a position 13 connected with the EGR passage 5, and a compressor 15 is provided in the intake pipe 3 at an upstream side of the intake throttle valve 11. The compressor 15 and the turbine 14 are coupled to each other by a rotating shaft 16 to constitute a turbocharger 17. An inter cooler 18 is provided in the intake pipe 3 at the downstream side of the compressor 15, and a waste gate 19 is provided in the exhaust pipe 2 at the upstream side of the turbine 14.

An injector 20 is provided in a cylinder head to inject fuel into a cylinder. An actuator 21 is provided in the injector 20 to control a fuel injection quantity and a fuel injection timing. A fuel injection system such as a common rail type or other conventional type is adopted as the actuator 21. The actuator 21 is connected to the ECU 7.

Data representing an operating state of the engine, such as an engine rotating speed (rpm) or an accelerator opening degree (or others such as a water temperature or an oil temperature), is inputted into the ECU 7. The ECU 7 transmits operation signals to the actuator 12 of the intake throttle valve 11, the actuator 8 of the EGR valve 6, and the actuator 21 of the injector 20 respectively, based on the inputted data.

Figure 1:
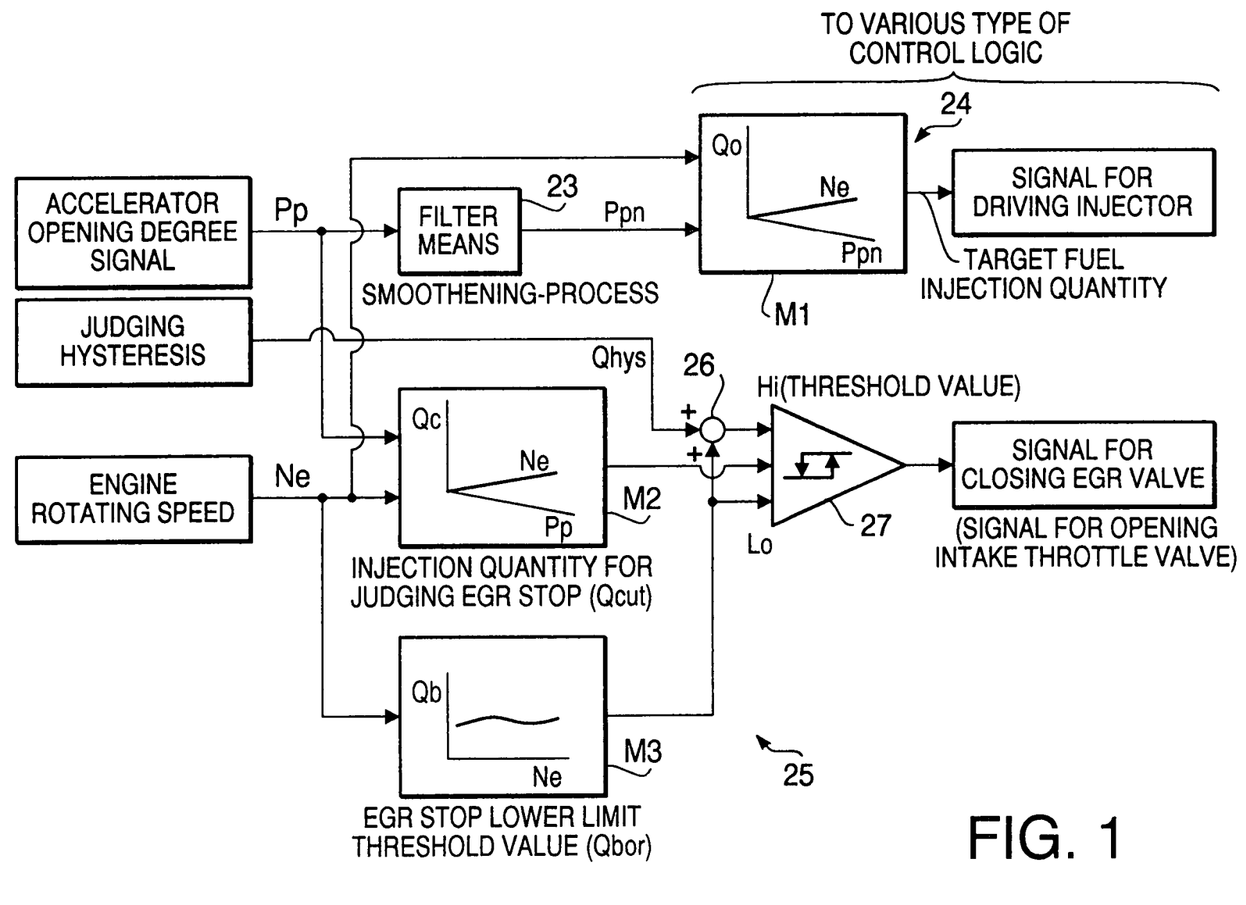
FIG. 1 is a system diagram depicting an EGR control apparatus for a diesel engine concerning a first embodiment of this invention.

Together with the EGR means 4, the ECU 7 constitutes the EGR control apparatus 22 concerning this embodiment. Programs to perform an EGR control as shown in FIG. 1 are inputted into the ECU 7. As illustrated, filter means 23 is inputted into ECU 7 as a program. The filter means 23 carries out a smoothening-process (e.g., a primary delay process) to an accelerator opening degree signal Pp detected by an accelerator opening degree sensor, and outputs an accelerator opening degree signal Ppn after smoothening-processed.

Injection quantity determination means 24 is also inputted into the ECU 7 as a program. The injection quantity determination means 24 calculates a target fuel injection quantity Qo to be injected from the injector 20, using the accelerator opening degree after smoothening-processed Ppn. This means 24 has a map M1 to output the above-mentioned injection quantity Qo based on at least the signal of the accelerator opening degree after smoothening-processed Ppn, and the signal of the engine rotating speed Ne.

Control means 25 is further inputted into the ECU 7 as a program. The control means 25 calculates a fuel injection quantity for judging EGR stop Qcut, using the signal of the accelerator opening degree before smoothening-processed Pp, and allows the first and/or second EGR means 4a and/or 4b to carry out a decrease control for the EGR volume when the fuel injection quantity for judging EGR stop Qcut exceeds a predetermined threshold value Hi.

The control means 25 has a map M2 to output the above-mentioned injection quantity Qcut based on at least the signal of the accelerator opening degree before smoothening-processed Pp and the signal of the engine rotating speed Ne. The control means 25 also has a map M3 to output an EGR stop lower limit threshold value Qbor (= Lo) based on at least the signal of the engine rotating speed Ne.

Furthermore, the control means 25 has an adding machine 26 to add a judging hysteresis value Qhys to the above-mentioned lower limit threshold value Qbor. The sum of these values (Qbor+Qhys) constitutes the above-mentioned threshold value Hi. Besides, the control means 25 has judgment means 27 into which the above-mentioned threshold value Hi, the above-mentioned lower limit threshold value (Qbor=Lo), and the above-mentioned injection quantity Qcut are inputted.

The judgment means 27 outputs an EGR stop signal, i.e., a signal for closing the EGR valve 6 and/or a signal for opening the intake throttle valve 11, to carry out a decrease control (a zero control in this embodiment) for EGR volume, when the injection quantity Qcut increases and then exceeds the threshold value Hi=Qbor+Qhys.

The judgment means 27 stops outputting the EGR stop signal when the injection quantity Qcut decreases and then becomes less than the lower limit threshold value Lo=Qbor. In this case, the opening degrees of the EGR valve 6 and/or the intake throttle valve 11 are controlled such that the normal volume of the EGR gas is supplied to the engine.

This normal EGR volume is such a volume that can suppress the combustion temperature and NOx, and can prevent deterioration of combustion and smoke, and is determined according to the map (not shown), based on the engine rotating speed signal Ne and the accelerator opening degree signal Pp, etc.

Figure 4:
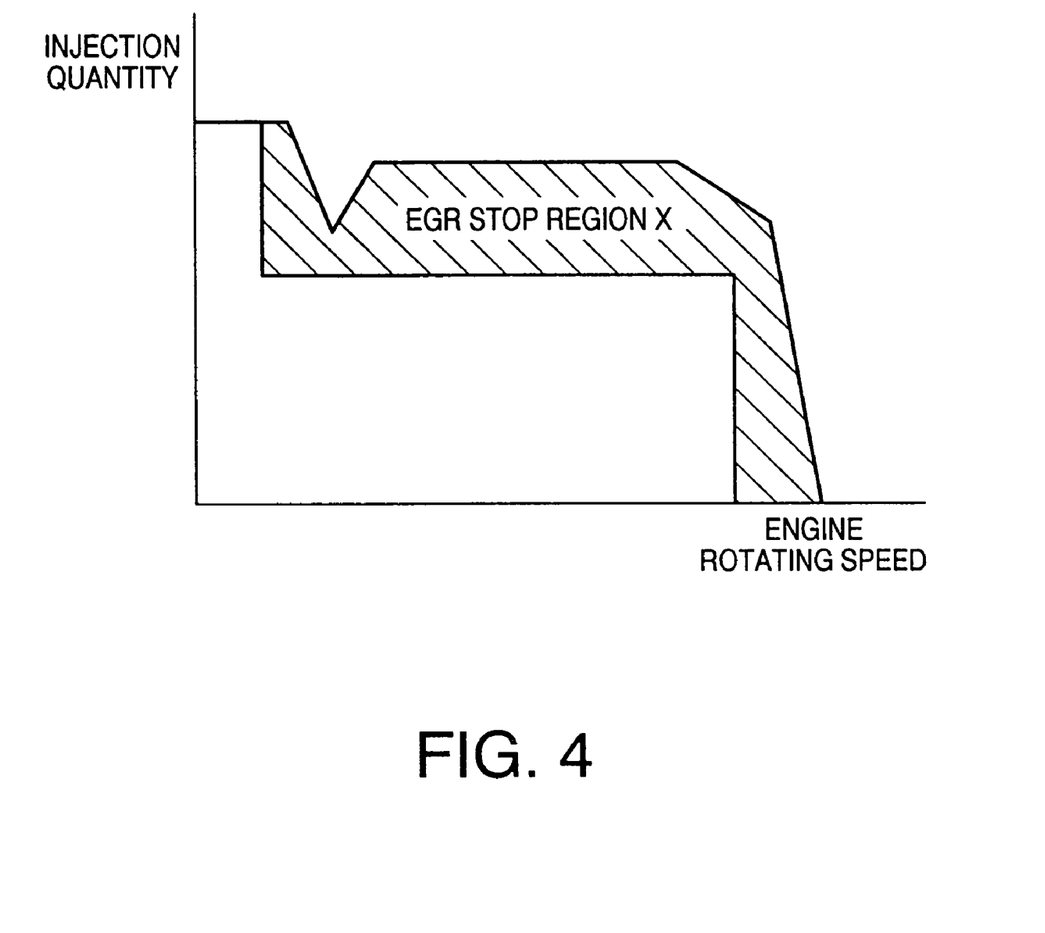
FIG. 4 is a diagram depicting an EGR stop region.

The EGR stop signal is outputted only when an engine operating state is in an EGR stop region x set as a high load and high speed region (at least a high load region), as shown in FIG. 4. It is because the smoke aggravation and the poor acceleration will occur unless the EGR is stopped in this EGR stop region x.

An operation of this embodiment consisting of the above-mentioned composition is described hereinafter.

When the accelerator is rapidly depressed and the engine operating state shifts to the high load region (the EGR stop region of FIG. 4) at the time of acceleration, the quantity of fuel injected from the injector 20 is increased and the EGR is stopped. The increase of the injection quantity and the EGR stop are performed as follows.

As shown in FIG. 1, the accelerator opening degree signal Pp outputted from the accelerator opening degree sensor is smoothening-processed by the filter means 23, and the accelerator opening degree after smoothening-processed Ppn which increases more gently than the actual accelerator opening degree is outputted.

Thereafter, the accelerator opening degree after smoothening-processed Ppn is inputted into the map M1 to calculate the target injection quantity Qo. Therefore, the injector 20 will inject the quantity Qo of fuel which is eased relative to an increase of the actual accelerator opening degree. Thereby, stepwise shock during acceleration is restrained.

Meanwhile, the accelerator opening degree before smoothening-processed Pp is inputted into the map M2 to calculate the injection quantity for judging EGR stop Qcut according to the increase of the actual accelerator opening degree not smoothening-processed. When the injection quantity Qcut exceeds the threshold value Hi, the EGR valve 6 is fully closed and/or the intake throttle valve 11 is fully opened to stop the EGR.

Thus, in this embodiment, the accelerator opening degree signal after smoothening-processed Ppn is used for determining the injection quantity Qo to be injected from the injector 20, while the accelerator opening degree signal Pp before smoothening-processed Pp is used for determining the injection quantity Qcut used as a criterion for judging the EGR stop.

Accordingly, even if the time lag caused by the mechanical opening and closing lag of the EGR valve 6 (and/or the intake throttle valve 11) and the airflow lag is taken into consideration, the EGR can be stopped in advance of (or approximately at the same time as) the increase of the fuel injection quantity from the injector 20. Therefore, sufficient amount of fresh intake air for the injection quantity which increases at the time of acceleration can be secured, and the smoke aggravation and the poor acceleration can be restrained.

Figure 3A:
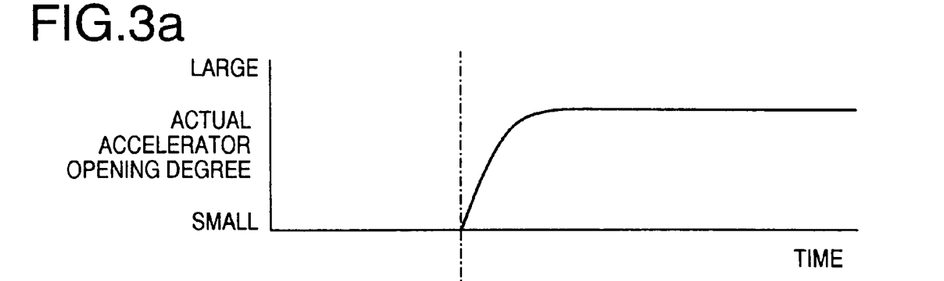
FIG. 3(a) is a diagram depicting change of an actual accelerator opening degree Pp.
Figure 3B:
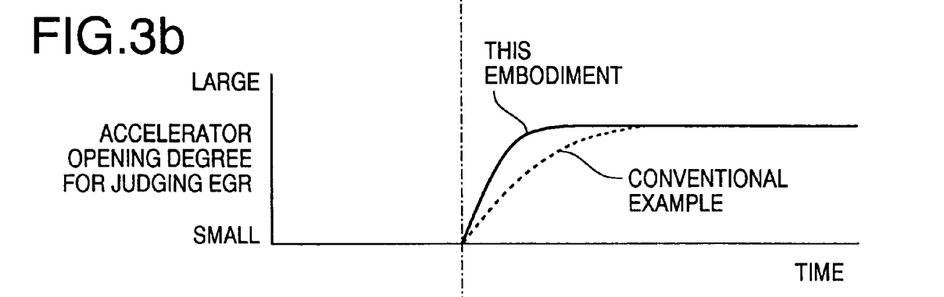
FIG. 3(b) is a diagram depicting change of an accelerator opening degree for judging EGR Ppn.

This point is now described in more detail. FIG. 3(a) shows the actual accelerator opening degree (Pp), a solid line of FIG. 3(b) shows the accelerator opening degree for judging EGR concerning this embodiment (i.e., the accelerator opening degree signal Pp before smoothening-processed), and a broken line of FIG. 3(b) shows the accelerator opening degree for judging EGR concerning a compared example (a conventional example) (i.e., the accelerator opening degree signal Pp after smoothening-processed).

As illustrated, in the conventional example, a smoothening-processed signal relative to the actual accelerator opening degree, i.e., the accelerator opening degree used for determining the injection quantity from the injector 20, has been used as the accelerator opening degree for judging EGR. On the contrary, in this embodiment, not the accelerator opening degree after smoothening-processed that is used for determining the injection quantity from the injector 20, but the actual accelerator opening degree before smoothening-processed (Pp) itself is used as the accelerator opening degree for judging EGR (Pp).

Figure 3C:
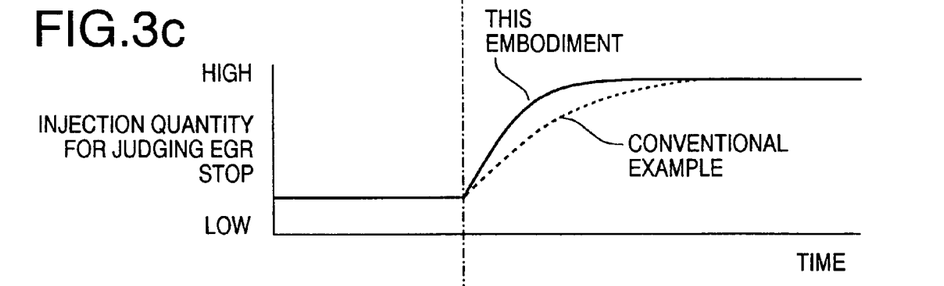
FIG. 3(c) is a diagram depicting change of an injection quantity for judging EGR stop.
Figure 3D:
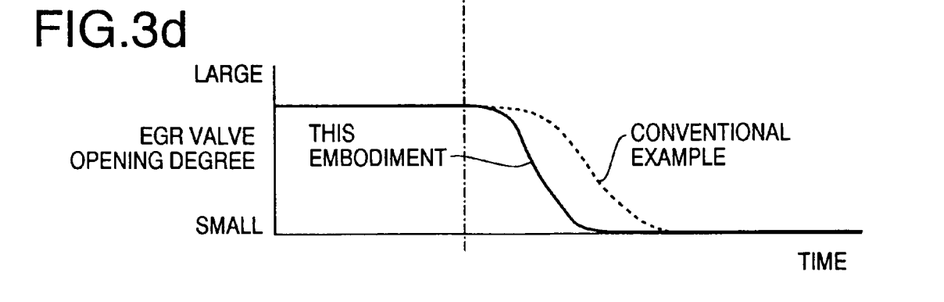
FIG. 3(d) is a diagram depicting change of an opening degree of the EGR valve.

Accordingly, as shown in FIG. 3(c), the injection quantity for judging EGR cut (Qcut) concerning this embodiment increases more quickly than the injection quantity for judging EGR cut of the conventional example, because the injection quantity Qcut concerning this embodiment is not smoothening-processed. Therefore, as shown in FIG. 3(d), the EGR valve 6 of this embodiment is closed more quickly than that of the conventional example (and/or, the intake throttle valve 11 of this embodiment is opened more quickly than that of the conventional example).

In this embodiment, the injection quantity after smoothening-processed shown by the broken line in FIG. 3(c) is used as the injection quantity Qo from the injector 20. Therefore, even if the time lag caused by the operation lag of the each valves 6, 11 and the airflow lag is taken into consideration, the fuel injection quantity from the injector 20 increases after (or approximately at the same time as) the EGR is stopped by the EGR valve 6 being closed (and/or the intake throttle valve 11 being opened).

Figure 2:
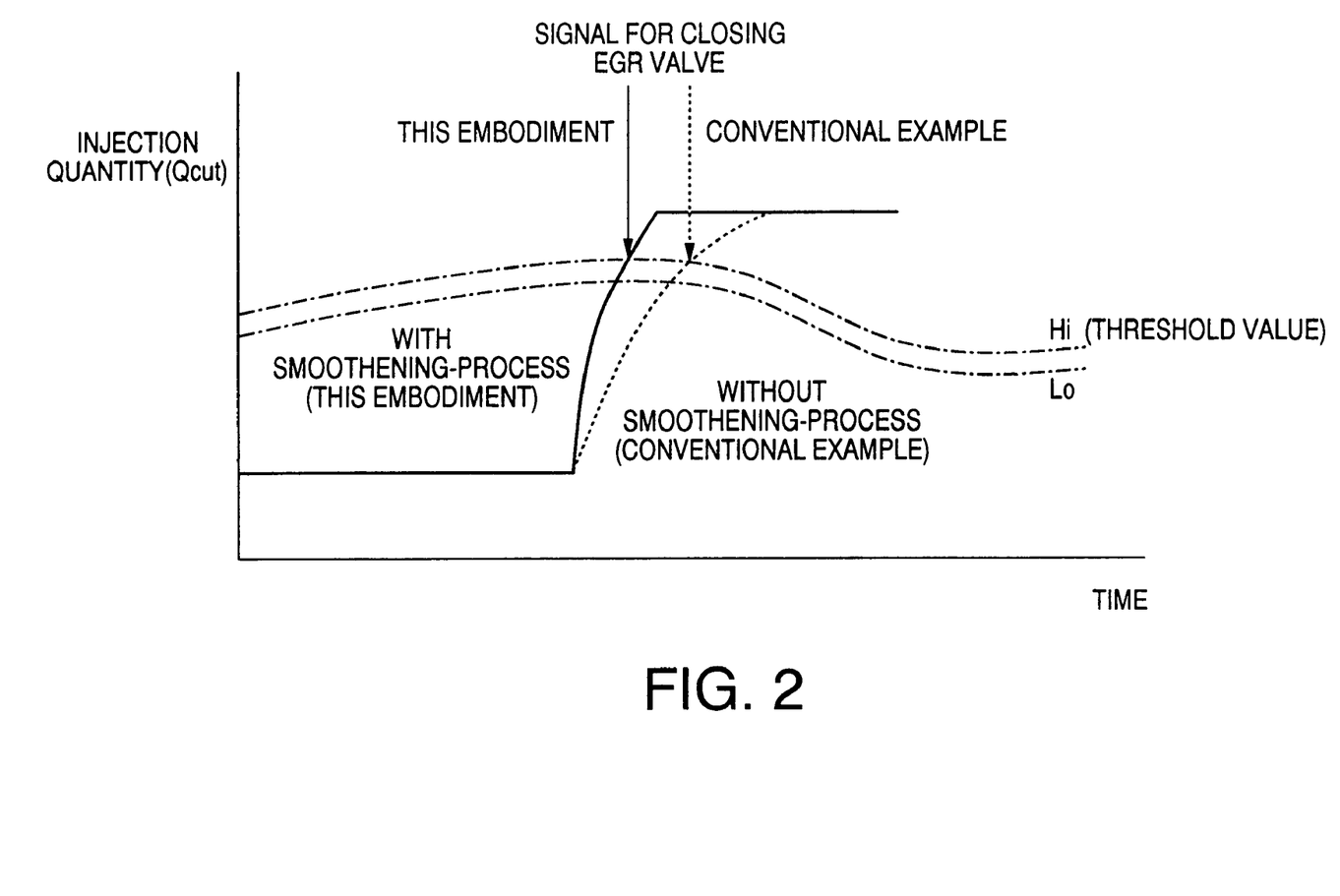
FIG. 2 is a diagram depicting an operation of the EGR control apparatus.

This operation is shown in FIG. 2. As depicted, as the injection quantity for judging Qcut, the signal after smoothening-processed is used in the conventional example, while the signal before smoothening-processed is used in this embodiment. Therefore, the signal in this embodiment exceeds the threshold value Hi sooner than the signal in the conventional example. Therefore, the EGR valve 6 (and/or the intake throttle valve 11) in this embodiment can be closed (and/or opened) sooner than the EGR valve (and/or the intake throttle valve) in the conventional example by the lead time.

Consequently, when the engine operating state shifts from an outside of the EGR stop region x shown in FIG. 4 into the EGR stop region x by the accelerator being rapidly depressed, the injection quantity from the injector 20 increases after (or approximately at the same time as) the EGR is stopped, even if the time lag caused by the operation lag of the EGR valve 6 (and/or the intake throttle valve 11) and the airflow lag is taken into consideration. Therefore, when the injection quantity from the injector 20 is increased, a sufficient volume of intake air can be secured, and the smoke aggravation and the poor acceleration are avoidable.

Figure 6:
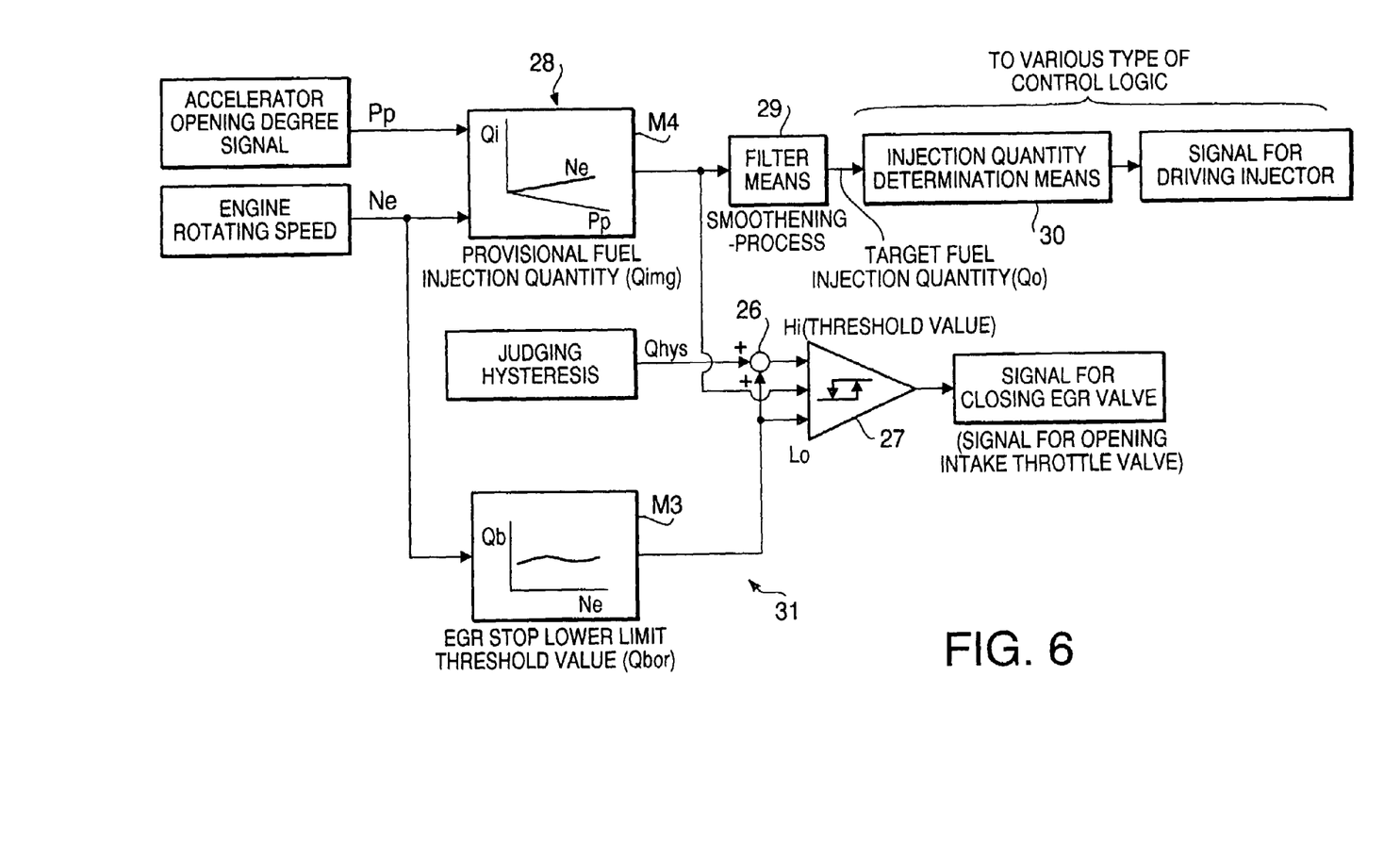
FIG. 6 is a system diagram depicting an EGR control apparatus according to another embodiment.

Modification is shown in FIG. 6.

As illustrated, in this embodiment, a provisional fuel injection quantity Qimg is calculated by using a map M4 of the calculation means 28, based on at least the accelerator opening degree before smoothening-processed Pp outputted from the accelerator sensor, and the engine rotating speed Ne outputted from the engine rotating speed sensor.

The injection quantity Qimg is smoothening-processed by the filter means 29, and then the target injection quantity Qo is determined by the injection quantity determination means 30 which uses the injection quantity after smoothening-processed. On the other hand, when the provisional injection quantity Qimg before smoothening-processed exceeds the predetermined threshold value Hi, the EGR valve 6 is controlled to close (and/or, the intake throttle valve 11 is controlled to open) by the control means 31. Thereby, the same operation and effect as the above-mentioned embodiment can be achieved.

In addition, in each of the above-mentioned embodiments, the target injection quantity after smoothening-processed Qo is used not only for a control of the fuel injection quantity from the injector 20, but also for a various type of control logic with a requirement to avoid the impact at the time of acceleration. Moreover, it is not always necessary to fully close the EGR valve 6, and it is not always necessary to fully open the intake throttle valve 11. That is, an EGR volume may be merely deaeased from the current volume, instead of making it zero. Furthermore, in the map M3 for determining the lower limit threshold value Qbor, a relation of the value Qbor to the engine rotation speed Ne may be linear or constant.

As is described above, according to the EGR control apparatus for the diesel engine relating to this embodiment, since it can carry out the decrease control of the EGR in advance of (or approximately at the same time as) increase of the fuel injection quantity at the time of acceleration, the smoke aggravation and the poor acceleration caused by deficiency of the intake air volume can be prevented.

What is claimed is:

1. An EGR control apparatus for a diesel engine comprising:
   EGR means to adjust an EGR volume which is recirculated from an exhaust pipe to an intake pipe;
   filter means to carry out a smoothening-process to an accelerator opening degree detected by an accelerator opening degree sensor;
   injection quantity determination means to determine a target fuel injection quantity to be injected from an injector, using the accelerator opening degree after smoothening-processed; and
   control means to calculate a fuel injection quantity for judging EGR stop, using the accelerator opening degree before smoothening-processed, to allow the EGR means to carry out a decrease control for the EGR volume when the fuel injection quantity for judging EGR stop exceeds a predetermined threshold value.

2. The EGR control apparatus as defined in claim 1, wherein the EGR means has an EGR passage which connects the exhaust pipe and the intake pipe with each other, and an EGR valve which is provided in the EGR passage and changes a passage area of the EGR passage to adjust the EGR volume.

3. The EGR control apparatus as defined in claim 1, wherein the EGR means has an EGR passage which communicates the exhaust pipe and the intake pipe with each other, and an intake throttle valve which is provided in the intake pipe at upstream side of a position connected with the EGR passage and changes a passage area of the intake pipe to adjust the EGR volume.

4. The EGR control apparatus as defined in claim 1, wherein the control means allows the EGR means to carry out the decrease control when an engine operating state is at least in a high load region.

5. The EGR control apparatus as defined in claim 1, wherein the fuel injection quantity for judging EGR stop is determined based on at least the accelerator opening degree before smoothening-processed by the filter means, and an engine rotating speed.

6. The EGR control apparatus as defined in claim 1, wherein the threshold value is calculated by adding a predetermined judging hysteresis to an EGR stop lower limit value determined based on an engine rotation speed.

7. The EGR control apparatus as defined in claim 6, wherein the control means prohibits the EGR means to carry out the decrease control when the fuel injection quantity for judging EGR stop becomes less than the EGR stop lower limit threshold value.

8. An EGR control apparatus for a diesel engine comprising:
   EGR means to adjust an EGR volume which is recirculated from an exhaust pipe to an intake pipe;
   calculation means to calculate a provisional fuel injection quantity, using an accelerator opening degree detected by an accelerator opening degree sensor;
   filter means to carry out a smoothening-process to the provisional fuel injection quantity calculated by the calculation means;
   fuel injection quantity determination means to control a fuel injection quantity to be injected from an injector, using the fuel injection quantity after smoothening-processed; and
   control means to allow the EGR means to carry out a decrease control for the EGR volume when the provisional fuel injection quantity before smoothening-processed exceeds a predetermined threshold value.

9. The EGR control apparatus as defined in claim 8, wherein the EGR means has an EGR passage which communicates the exhaust pipe and the intake pipe with each other, and an EGR valve which is provided in the EGR passage and changes a passage area of the EGR passage to adjust the EGR volume.

10. The EGR control apparatus as defined in claim 8, wherein the EGR means has an EGR passage which communicates the exhaust pipe and the intake pipe with each other, and an intake throttle valve which is provided in the intake pipe at upstream side of a position connected with the EGR passage and changes a passage area of the intake pipe to adjust the EGR volume.

11. The EGR control apparatus as defined in claim 8, wherein the control means allows the EGR means to carry out the decrease control when an engine operating state is at least in a high load region.

12. The EGR control apparatus as defined in claim 8, wherein the provisional fuel injection quantity is determined based on at least the accelerator opening degree detected by the accelerator opening degree sensor and an engine rotating speed.

13. The EGR control apparatus as defined in claim 8, wherein the threshold value is calculated by adding a predetermined judging hysteresis to an EGR stop lower limit value determined based on an engine rotating speed.

14. The EGR control apparatus as defined in claim 13, wherein the control means prohibits the EGR means to carry out the decrease control when the fuel injection quantity for judging EGR stop becomes less than the EGR stop lower limit threshold value.

15. An EGR control apparatus comprising:
   an accelerator opening degree sensor to detect an accelerator opening degree;
   EGR means to adjust an EGR volume which is recirculated from an exhaust pipe to an intake pipe of an engine;

an injector to inject fuel into a cylinder of the engine; and
an ECU to determine a signal for driving the injector and a signal for driving the EGR means;
wherein the ECU carries out a smoothening-process to a signal obtained from the accelerator opening degree sensor, determines the signal for driving the injector based on the signal smoothening-processed, and utilize the signal obtained from the accelerator opening degree sensor not smoothening-processed to determine the signal for driving the EGR means based on the signal before smoothening-processed.

16. The EGR control apparatus as defined in claim 15, wherein the ECU determines a signal for decreasing the EGR volume as the signal for driving the EGR means in at least a high load region of the engine operating state.

* * * * *